US008485538B1

(12) United States Patent
Strong et al.

(10) Patent No.: US 8,485,538 B1
(45) Date of Patent: Jul. 16, 2013

(54) AUXILIARY AXLE SUSPENSION SYSTEM

(76) Inventors: Brooks Strong, Houston, TX (US);
Joshua Cayne Fisher, Montgomery, TX (US)

( * ) Notice: Subject to any disclaimer, the term of this patent is extended or adjusted under 35 U.S.C. 154(b) by 0 days.

(21) Appl. No.: 13/449,247

(22) Filed: Apr. 17, 2012

(51) Int. Cl.
*B62D 61/12* (2006.01)

(52) U.S. Cl.
USPC ............... 280/86.5; 280/43.15; 280/43.17; 280/43.23; 280/124.158; 280/124.159; 180/24.02; 180/209

(58) Field of Classification Search
USPC ........ 280/86.5, 43.13, 43.17, 43.23, 124.157, 280/124.158, 124.159; 180/24.02, 209
See application file for complete search history.

(56) References Cited

U.S. PATENT DOCUMENTS

| 3,761,110 | A | * | 9/1973 | Grosseau | 280/124.159 |
| 3,838,885 | A | * | 10/1974 | Brennan et al. | 298/22 R |
| 3,912,293 | A | * | 10/1975 | Harbers | 280/81.1 |
| 5,823,629 | A | * | 10/1998 | Smith et al. | 298/23 R |
| 6,116,698 | A | * | 9/2000 | Smith et al. | 298/23 R |
| 6,371,227 | B2 | * | 4/2002 | Bartlett | 180/24.02 |
| 7,845,659 | B2 | * | 12/2010 | Hudson et al. | 280/86.5 |
| 8,262,109 | B1 | * | 9/2012 | Bell et al. | 280/93.506 |
| 2009/0205883 | A1 | * | 8/2009 | Strong | 180/24.02 |

* cited by examiner

*Primary Examiner* — Joseph Rocca
*Assistant Examiner* — Darlene P Condra
(74) *Attorney, Agent, or Firm* — Ronald L. Phillips

(57) ABSTRACT

An auxiliary axle suspension system for a motor vehicle is disclosed wherein a pair of hydraulically operated actuators position and force the auxiliary axle to help support the vehicle. And gas springs are provided that allow the actuators to extend and retract over a wide range of hydraulic operating pressure and thereby allow the auxiliary axle to adjust to a wide range of road grade differences between the auxiliary axle wheels and the wheels of the axles that normally support the vehicle without incurring significant gas and hydraulic pressure fluctuation and while isolating shock forces on the auxiliary axle wheels from the vehicle.

14 Claims, 17 Drawing Sheets

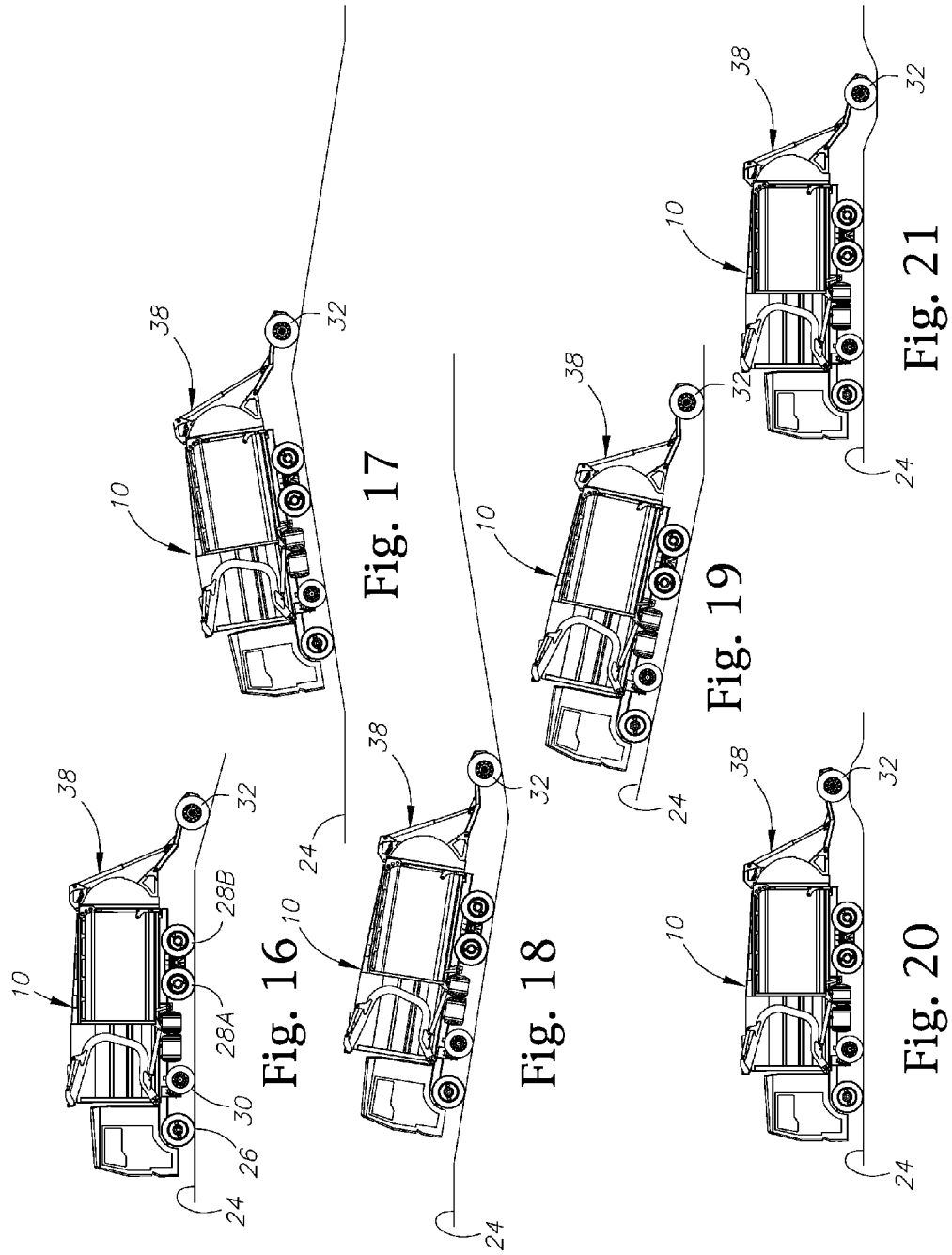

AUXILIARY AXLE SUSPENSION SYSTEM

TECHNICAL FIELD

This invention relates to auxiliary axle suspension systems for motor vehicles and more particularly to the hydraulically operated actuators used in such suspension systems.

BACKGROUND OF THE INVENTION

In the hydraulically operated suspension systems that suspend an auxiliary axle from a motor vehicle in a deployable manner to help support the vehicle, it is common practice to employ a pair of hydraulically operated actuators. Wherein the actuators are operable to position the auxiliary axle in a stowed condition on the vehicle and in an active condition wherein the auxiliary axle is forced to help support the vehicle with the auxiliary axle wheels. And it is desirable that the actuators be capable of allowing significant up and down travel of the auxiliary axle in a sprung manner relative to the vehicle to accommodate differences in road elevation between the auxiliary axle and the other axles supporting the vehicle. Including when the auxiliary axle wheels encounter bumps and dips in the road surface. And when the auxiliary axle is being used in a minor or major supporting manner.

This springing effect can be provided by employing a gas spring with each of the actuators such that the actuators are allowed to extend and contract with gas spring action and thereby allow the auxiliary axle to adapt in a sprung manner in accommodating differences in road grade between the auxiliary axle and the other axles supporting the vehicle and this includes the auxiliary axle wheel encountering bumps and dips and all while the auxiliary axle continues to help support the vehicle. And it is desirable that this be accomplished without incurring significant gas and hydraulic pressure fluctuation that could adversely affect the desired operation. Including when the actuators are employed in a manner that contributes to a significant degree to vehicle stability and in preventing shock forces on the auxiliary axle wheels from being transmitted to the vehicle such as when the auxiliary axle wheels encounter bumps and dips.

To prevent such adverse effects from occurring in the case of an auxiliary axle that operates at a substantial distance behind the vehicle and is commonly referred to as a trailing axle, each of the actuators may for example be provided with a gas spring wherein the gas springs share a gas pressure accumulator and the gas circuit is charged with a suitable gas at a pressure sufficient to provide the gas springs with a spring compliance meeting the projected demands that can include allowing the trailing axle a wide range of travel to adjust to road grade changes at the trailing axle. However, it may not be practical or desirable to rely on such gas springs with a shared gas pressure accumulator or separate gas pressure accumulators and especially where the actuators are unusually long in extent and are required to extend and retract to a large extent in allowing for the trailing axle to adapt to large road grade changes at the trailing axle as well as when the trailing axle wheels encounter bumps and dips in the road. And this also applies to an auxiliary axle that may be deployed at a different location with respect to the vehicle and it is desired to have similar operating conditions.

SUMMARY OF THE INVENTION

The present invention provides a suspension system for suspending an auxiliary axle from a motor vehicle in a manner that prevents significant gas and hydraulic fluctuations throughout a wide range of differences in road grade between the auxiliary axle and the other axles supporting the vehicle. Wherein a pair of hydraulically operated actuators are employed to position and force the auxiliary axle to help support the vehicle and a first-stage gas spring is provided that is operatively associated with the hydraulic pressure operating the actuators and is adapted below a predetermined operating pressure to allow the actuators to extend and retract and thereby allow the auxiliary axle to travel in reaction to road grade differences between the auxiliary axle and the other axles while continuing to help support the vehicle but to a certain degree and without incurring significant gas and hydraulic pressure fluctuations and while isolating shock forces on the trailing wheels from the vehicle. And wherein the actuators are each provided with a second-stage gas spring operatively associated with the operating hydraulic pressure and with these gas springs adapted to allow the actuators to extend and retract to the same extent allowed by the first-stage gas spring when the pressure exceeds the predetermined operating pressure in helping to support the vehicle to a greater degree as well as to prevent significant gas and hydraulic pressure fluctuation and isolate shock forces on the trailing axle wheels from the vehicle.

These and other features and aspects of the invention will become more apparent from the accompanying drawings of an exemplary embodiment and the description thereof.

DESCRIPTION OF THE DRAWINGS

FIG. 16 is a reduced side view of the truck as depicted in FIG. 4 with the vehicle remaining on a level portion of the road surface while the trailing axle wheels are then on an upwardly inclined portion of the road surface;

FIG. 17 is a view like FIG. 16 but with the truck on an downwardly inclined portion of the road surface while the trailing axle wheels are on an upwardly inclined portion of the road surface;

FIG. 18 is a view like FIG. 16 but with the truck on an upwardly inclined portion of the road surface while the trailing axle wheels are on a downwardly inclined portion of the road surface;

FIG. 19 is a view like FIG. 16 but with the truck on an upwardly inclined portion of the road surface while the trailing axle wheels are on a level portion of the road surface;

FIG. 20 is a reduced side view of the truck as shown in FIG. 4 but with the trailing axle wheels encountering a bump in the road surface;

FIG. 21 is a view like FIG. 20 but with the trailing axle wheels encountering a dip in the road surface;

DESCRIPTION OF EXEMPLARY EMBODIMENT

Figure 1:
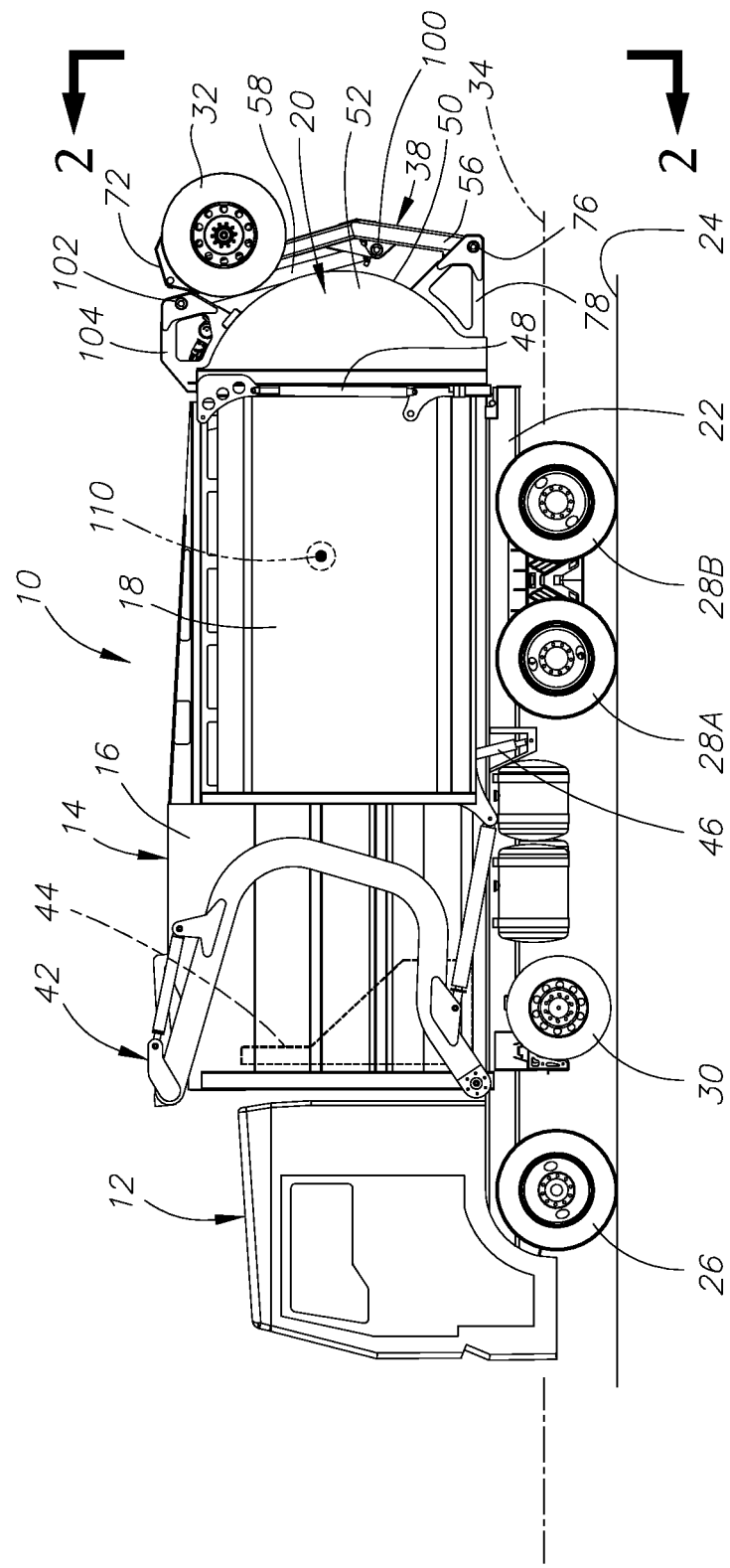
FIG. 1 is a side view of a front-loading refuse truck embodying the present invention wherein the trailing axle is shown in its stowed condition.

The present invention is disclosed as embodied in a payload-carrying motor vehicle in the form of a heavy-duty front-loading refuse truck 10 having a cab 12 that serves as a vehicle operator and passenger compartment and a truck body 14 that serves as a payload container. Wherein the latter comprises a forwardly-located refuse receiving section 16 and an adjoining rearward-located refuse collecting section 18 having a tailgate 20 for discharging the refuse. With the cab 12 and the truck body 14 mounted on a frame 22 and the frame in turn normally supported on a road surface 24 by steerable front wheels 26 located under the cab 12 and driven tandem-arranged rear wheels 28A, 28B located under the refuse collecting section 18 which are associated with the primary axles of the vehicle. And to increase the load capacity of the truck, the truck has deployable auxiliary wheels 30 commonly referred to as pusher wheels that are located between the front wheels 26 and driven rear wheels 28A, 28B and under a forward portion of the refuse receiving section 16. And to further increase the truck's load capacity, the truck is provided with deployable auxiliary wheels 32 that on deployment operate at a significant distance rearward of the truck frame and are commonly referred to as trailing wheels.

All of the wheels are of a convention type with pneumatic tires and have vehicle operator controlled service brakes of a suitable conventional type. And it will also be understood that the front wheels 26, rear driven wheels 28A, 28B and pusher wheels 30 are mounted on axles that are suspended from laterally spaced locations on the frame 22 by conventional suspension systems. Wherein the front axle suspension system employs steel leaf springs and the drive axle suspension system has either steel leaf springs or rubber springs and in serving the primary axles of the truck establish a roll axis 34 about which the frame 22 and thus the cab 12 and truck body 14 can tilt/roll to a limited degree in a cushioned/sprung manner.

Figure 4:
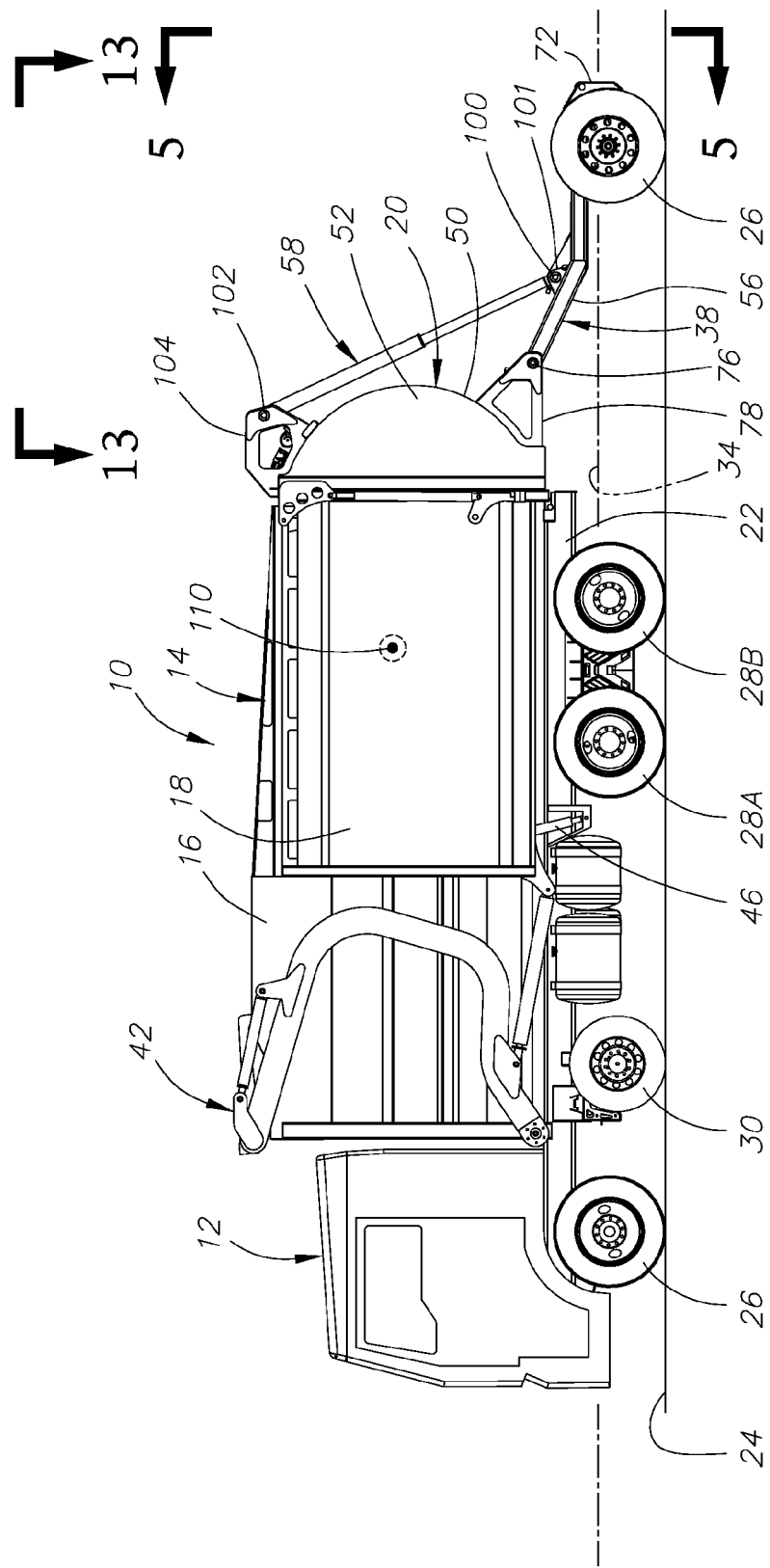
FIG. 4 is a view like FIG. 1 but showing the pusher axle wheels and the trailing axle wheels in their deployed active condition.

Whereas the pusher axle suspension system employs gas springs and the pusher wheels 30 are deployable on vehicle operator command from a stowed condition shown in FIG. 1 where they do not contact with a road surface to an active condition as shown in FIG. 4 where they are forced to contact with the road surface and thereby assist in supporting the vehicle frame to a certain degree and also in a cushioned/sprung manner. And whereas the trailing wheels 32 are also deployable on vehicle operator command to assist in supporting the vehicle frame and are mounted in a steerable manner on an axle 36 that is suspended from the tailgate 20 by a trailing axle suspension system 38 according to the present invention.

Continuing on with the other truck components as well as the trailing axle suspension system 38, the collecting of refuse is provided by an opening in the top of the refuse receiving section 16 that is opened and closed by a roof panel 40 in a conventional manner under vehicle operator control. See FIG. 3. And for picking up refuse, the truck has a front-loading refuse container pickup system 42 of a conventional type under vehicle operator command. Wherein the pickup system 42 is adapted to pick up refuse collectors from in front of the truck and by lifting action over the cab 12 provide for depositing the collected refuse through the roof opening into the refuse receiving section 16.

Figure 8:
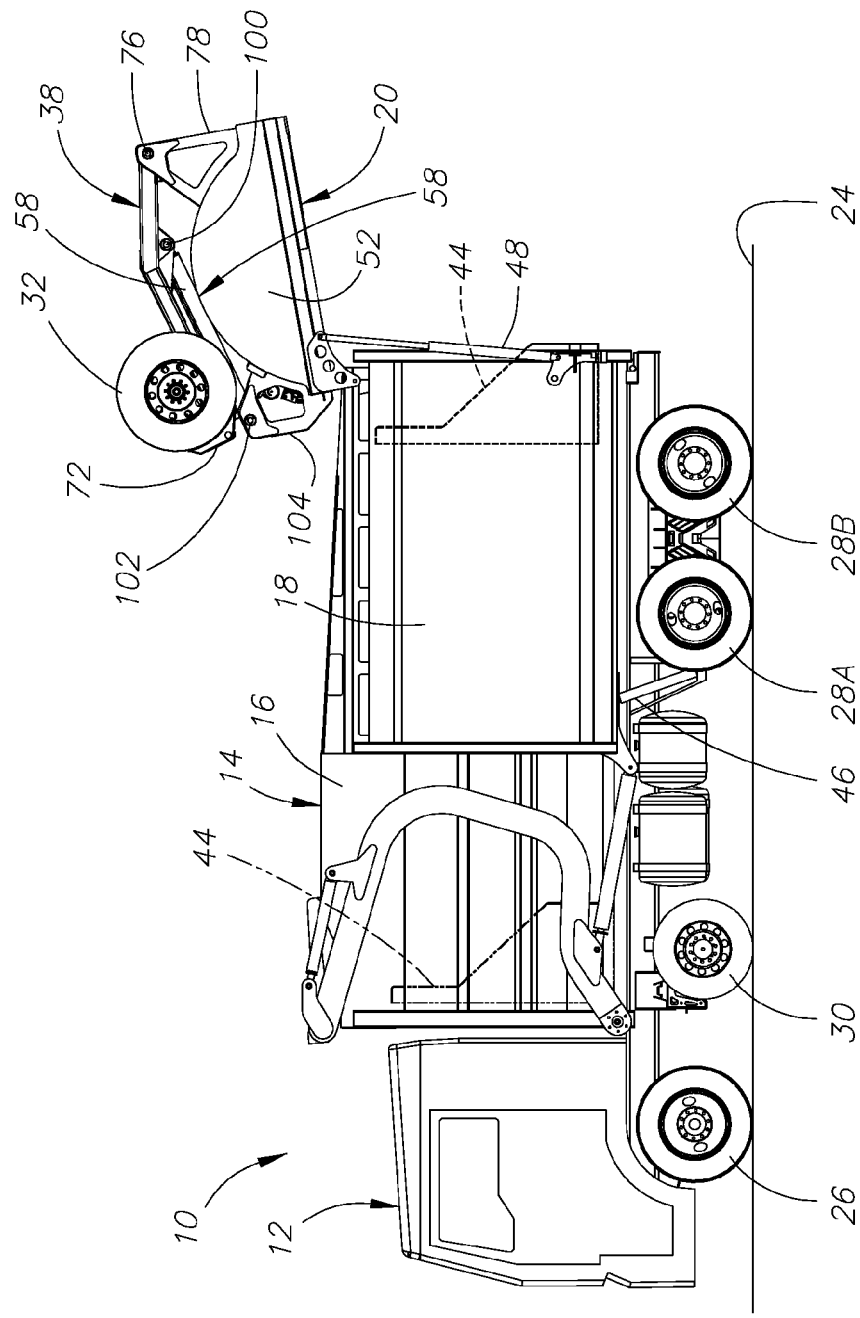
FIG. 8 is a view like FIG. 1 but showing the tailgate opened to discharge a load of refuse.
Figure 9:
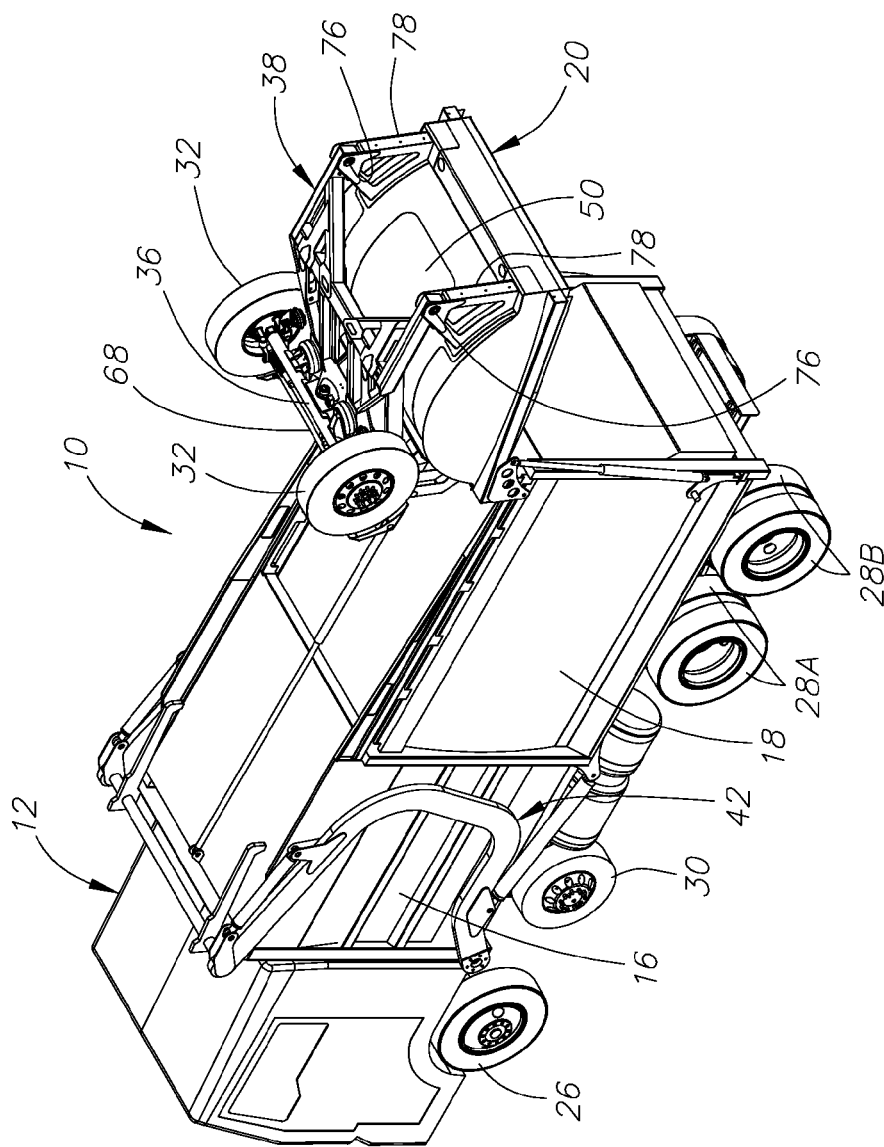
FIG. 9 is an isometric view of the truck as depicted in FIG. 8.

And with refuse thus deposited in the receiving section 16, the refuse is then managed in a conventional manner with a powered ram 44 mounted in the truck body. Wherein the ram 44 is shown in FIG. 1 in its fully retracted position when refuse is being received in the receiving section 16 and is shown in its fully extended position in FIG. 8 in pushing the refuse from the collecting station 18 onto a delivery site with the tailgate open. And wherein it will be understood that the ram 44 is operated in a conventional manner under operator command as refuse is received to force the refuse from the receiving section 16 into the collecting section 18 and with repeated refuse pick up operates to compact the refuse into a relatively dense mass in the collecting section that is located over the driven wheels 28A, 28B.

Figure 10:
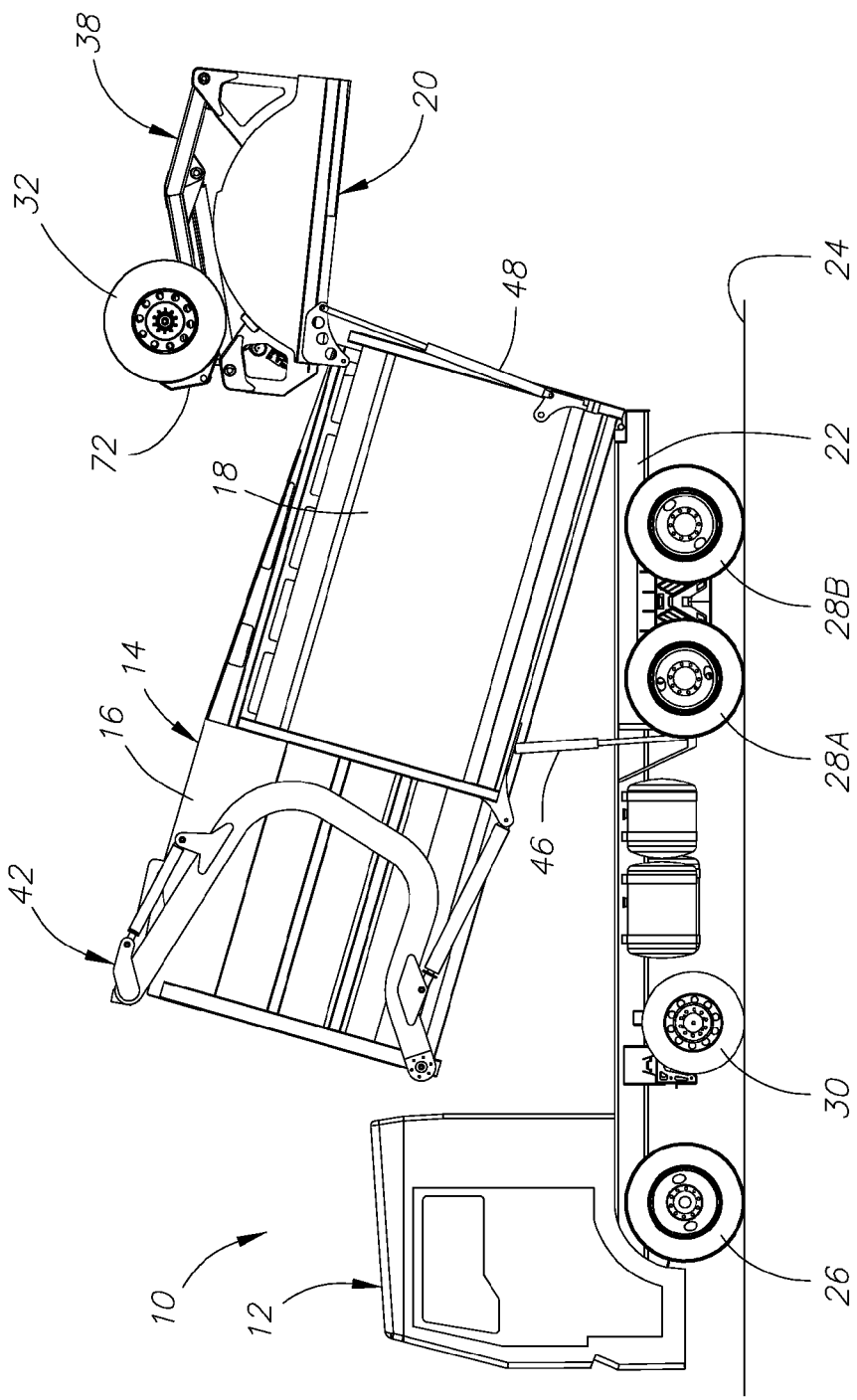
FIG. 10 is a view like FIG. 8 but showing the truck body/payload container tilted to discharge a load of refuse.
Figure 11:
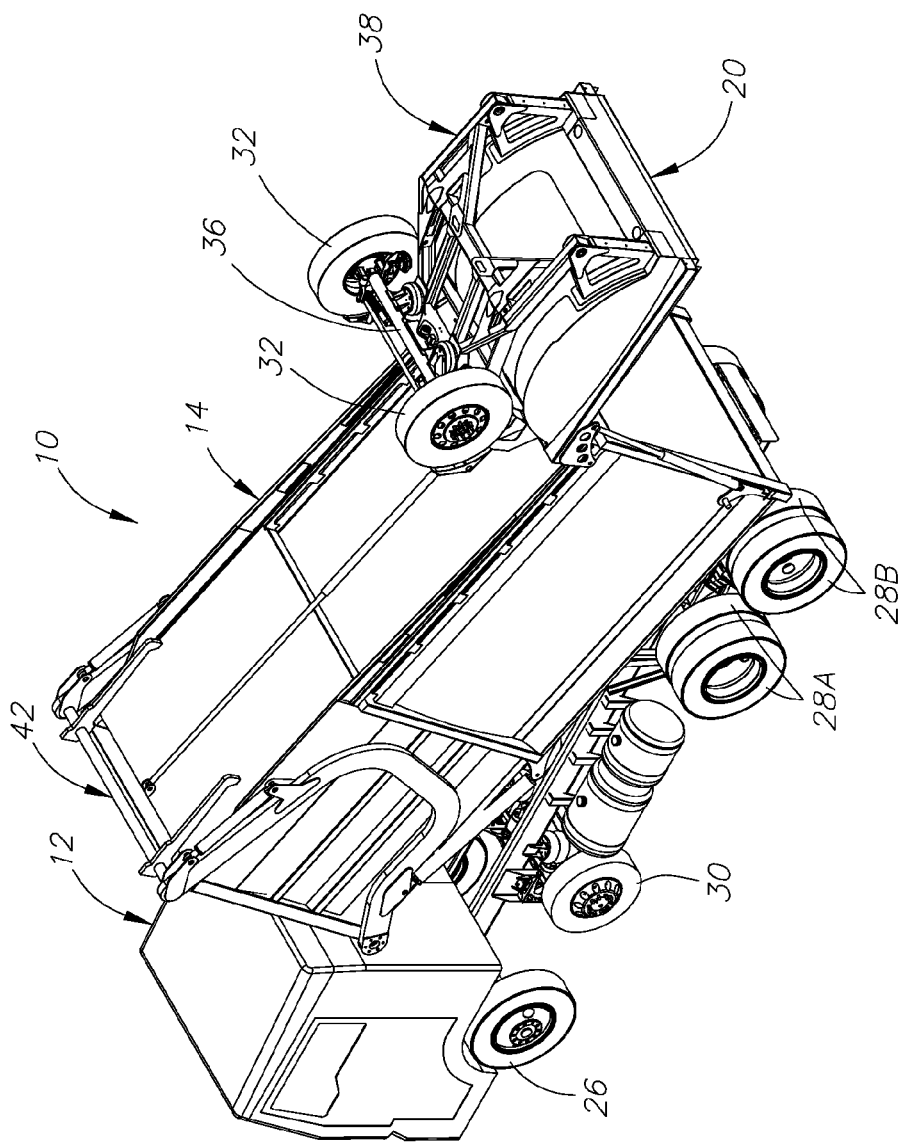
FIG. 11 is an isometric view of the truck as depicted in FIG. 10.
Figure 12:
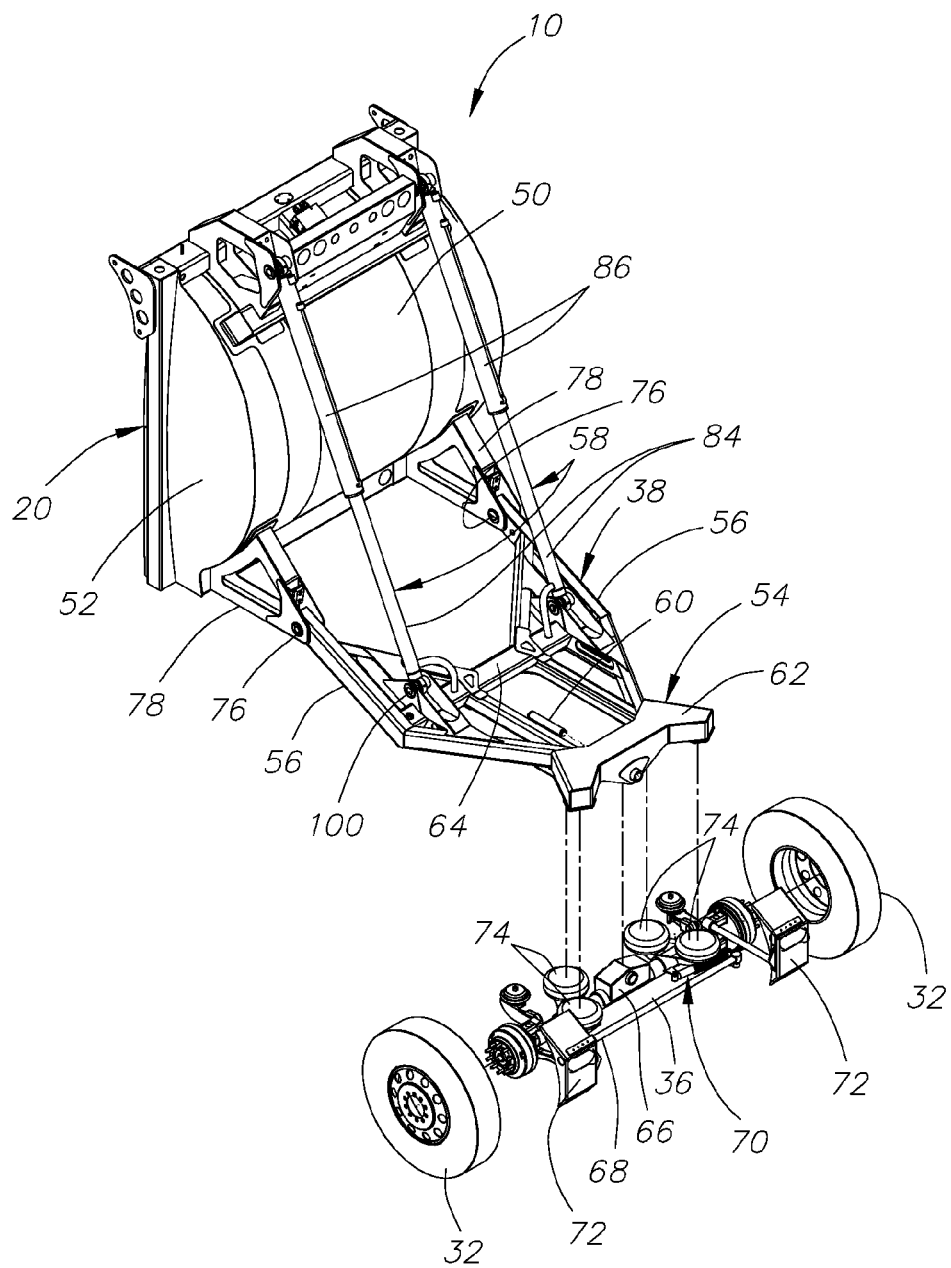
FIG. 12 is an exploded isometric view of the trailing axle assembly.

With the provision of the ram 44, it is not necessary to tilt the truck body for discharging a load from the truck. However, the truck body 14 is adapted to be tilted for maintenance and also possibly discharging a load without the operation of the ram 44. And this is provided by the truck body being hinged at its lower rear end to the vehicle frame 22 and tilting the truck body with a pair of vehicle operator controlled hydraulic cylinders 46. See FIG. 10 that shows only the near-side hydraulic cylinder 46. Whereby the truck body 14 is tilted from a nesting position on the vehicle frame 22 as shown in FIG. 1 to a suitable angled position as shown in FIG. 10.

Further describing the tailgate 20, it is hinged in a conventional manner at its upper end to the upper rear end of the refuse collecting section 18 and is swung between its closed position shown in FIGS. 1-7 and its open position shown in FIGS. 8-11 by a pair of hydraulic cylinders 48. Wherein the hydraulic cylinders 48 are located outboard of the truck body 14 at the rear end of the refuse collecting section 18, are operatively connected between the tailgate 20 and the truck body 14 in a conventional manner, and are under the control of the vehicle operator to open and close the tailgate. And wherein it will be understood that the tailgate 20 is held firmly closed at its lower end by a suitable latching mechanism of a conventional type that retains the tailgate in its closed condition on full closure and is released by the vehicle operator to allow opening.

In addition to providing opening and closure of the truck body 14, the tailgate 20 also provides increased refuse collecting capacity in having a rearward-projecting convex side 50 and opposite-facing side walls 52 which cooperatively form an extension of the refuse collecting section 18 with the tailgate closed and latched that projects a substantial distance beyond the rear end of the truck frame 22. Whereby the tailgate 20 significantly adds to the capacity of the collecting station 18 beyond the rearward extent of the truck frame but presents an obstacle to providing for efficient stowage of a trailing axle suspended from the tailgate. And even without such projection, the tailgate presents challenges in utilizing a tailgate suspended trailing axle to best advantage with regard to allowing significant trailing axle travel in accommodating road grade changes at its wheels, isolating shock forces on its wheels from the frame and thus the cab and truck body, and adding significantly to the vehicle's roll stability. Wherein the vehicle frame and thus the cab and truck body can roll and pitch with respect to the roll axis 34 in cushioned manner as permitted by the front axle and driven axle suspension systems and can also yaw but to a very limited extent such as with a severe change in vehicle direction.

In adding to the payload capacity and the wheelbase of the refuse truck with the trailing axle 36 as well as substantially enhancing the roll stability of the truck, the trailing axle suspension system 38 accomplishes this in an operationally strategic manner. Wherein a carriage 54 is provided from which the trailing axle 36 is directly suspended and the carriage has a pair of rigidly joined suspension arms 56 and together with a pair of actuators 58 suspend the trailing axle carriage and thereby the trailing axle directly from the tailgate 20 and thereby from the vehicle frame 22 via the truck body 14.

Figure 13:
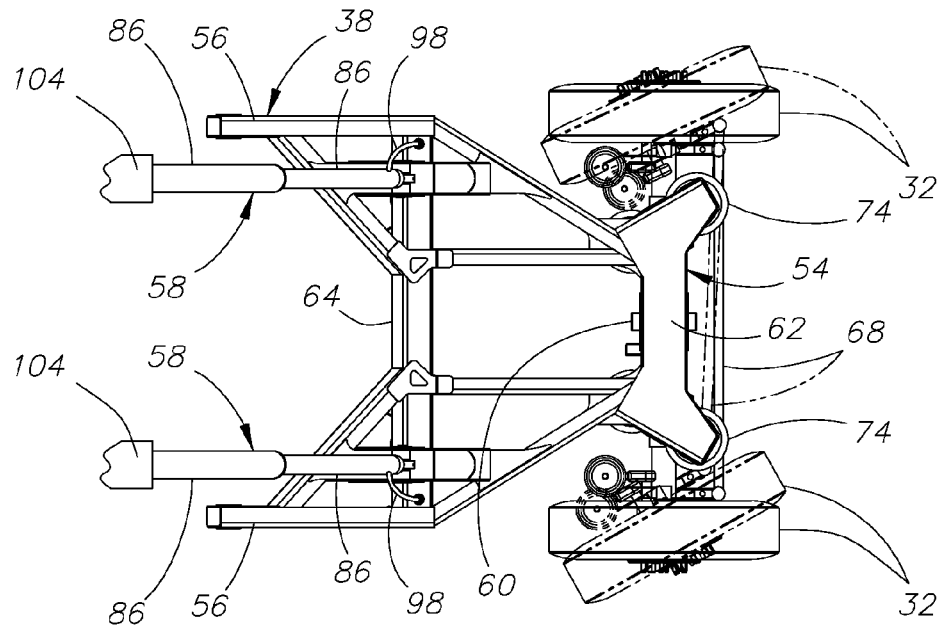
FIG. 13 is an enlarged view taken along the lines 13-13 in FIG. 4 when looking in the direction of the arrows and with the trailing axle's steerable wheels shown in solid lines in their normal neutral position and shown in phantom lines at one of their maximum steering angles and the wheel fenders omitted.
Figure 14:
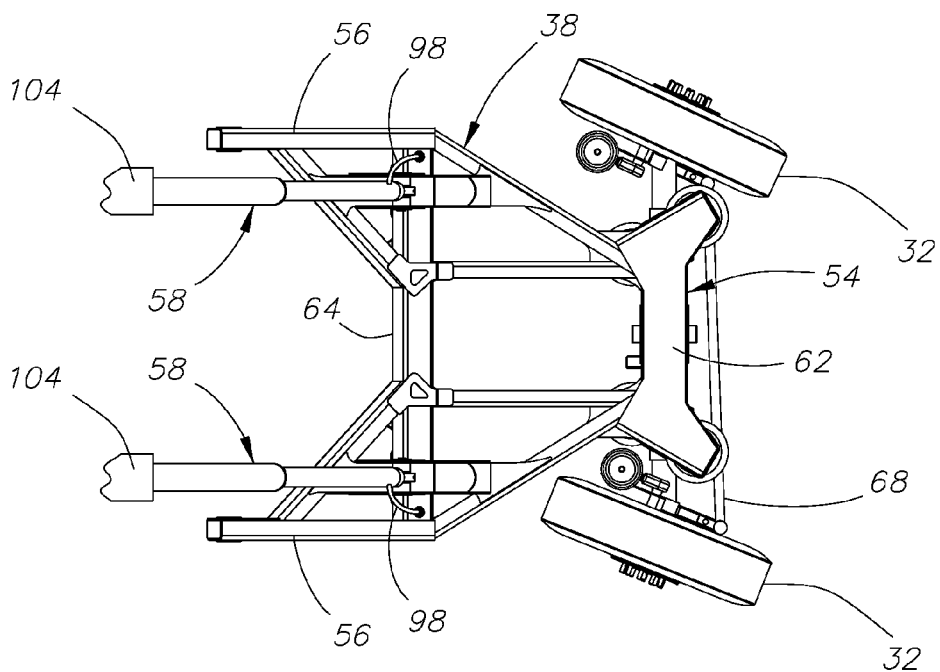
FIG. 14 is a view like FIG. 13 but showing the trailing axle's steerable wheels at their other maximum steering angle.

The trailing axle 36 is pivotally mounted on the carriage 54 at a central location on the axle offset from the axle center-line by a pivot pin 60 that sets the roll axis of the axle and is received by a laterally extending contoured crossmember 62 that forms the body of the carriage. Wherein the crossmember 62 is rigidly joined at laterally spaced locations to the carriage suspension arms 56 and is trussed with a crossbeam 64 that is rigidly joined at its opposite ends with the suspension arms 64 at an intermediate location along their length where the arms angle inwardly for their joinder with the body 62 of the carriage and allow the trailing axle wheels 32 to steer to a significant degree. See FIGS. 13 and 14. With the carriage body 62 also providing for the mounting of springs that directly act on the trailing axle 36 as described later as well as serving to pivotally support the trailing axle. Wherein the carriage body 62 in providing such trailing axle support receives at its underside a boxed center portion 66 of the trailing axle assembly in a sandwiching manner where after the pivot pin 60 is inserted though both to complete the pivotal connection of the trailing axle with the carriage. See FIGS. 5-7 and 12.

The trailing axle wheels 32 are steered by truck motion as the truck is turned by the truck operator steering the front wheels 26 and for this operation are mounted in a conventional manner on the ends of the trailing axle 36 with spindles that provide a suitable camber and caster angle and have their steering arms connected by an adjustable tie rod 68 that sets the desired toe-in for the wheels. And in providing for such steering action, the trailing axle wheels 32 are stabilized and returned following their forced steerage to a normal neutral condition by their camber angle and coil spring and shock absorber assemblies 70 that are connected between the spindle steering arms and the carriage 54. See FIGS. 2, 7 and 12. And with the trailing axle wheels being steerable, fenders 72 are provided that are mounted on the trailing axle wheel spindles so as to trail behind and thus turn conjointly with the respective wheels when the trailing axle is active. For example, see FIG. 13 that shows the trailing axle wheels 32 at one maximum steering angle in solid lines and at zero steer angle in phantom lines and FIG. 14 that shows the wheels at their opposite maximum steering angle.

With the trailing axle 36 pivotally mounted on the carriage 54 with the pivot pin 60, tilting movement of the axle relative to the carriage is resisted by four gas springs 74 of elastomeric bag construction located in pairs on opposite sides of the trailing axle pivot pin 60 and mounted between the trailing axle and the carriage. See FIGS. 2, 7 and 12. And unlike the pusher wheel suspension system, the carriage gas springs 74 are continuously filled with air at a suitable pressure that can be increased or decreased by the vehicle operator according to the loading on the trailing axle and the degree to which they are desired to contribute to vehicle roll stability as further described later.

Figure 2:
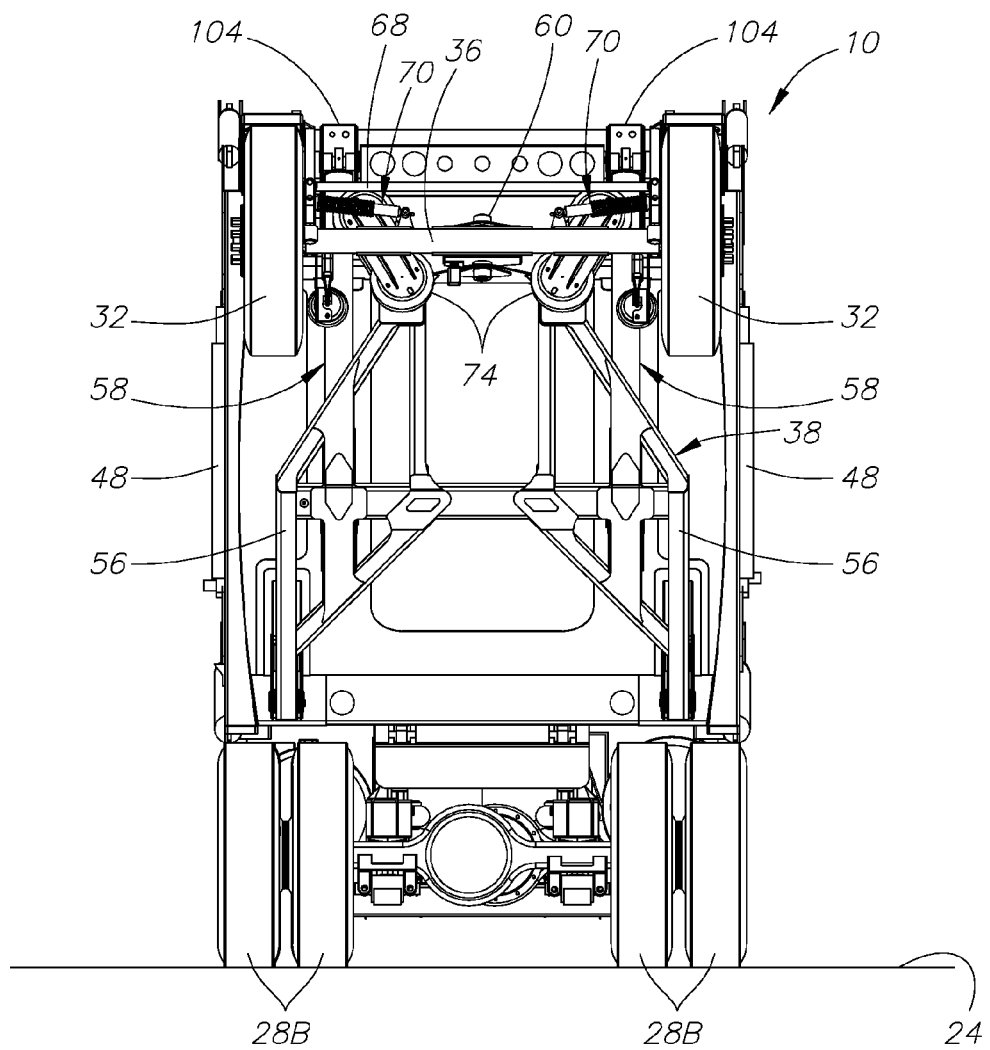
FIG. 2 is an enlarged view taken along the lines 2-2 in FIG. 1 when looking in the direction of the arrows.
Figure 3:
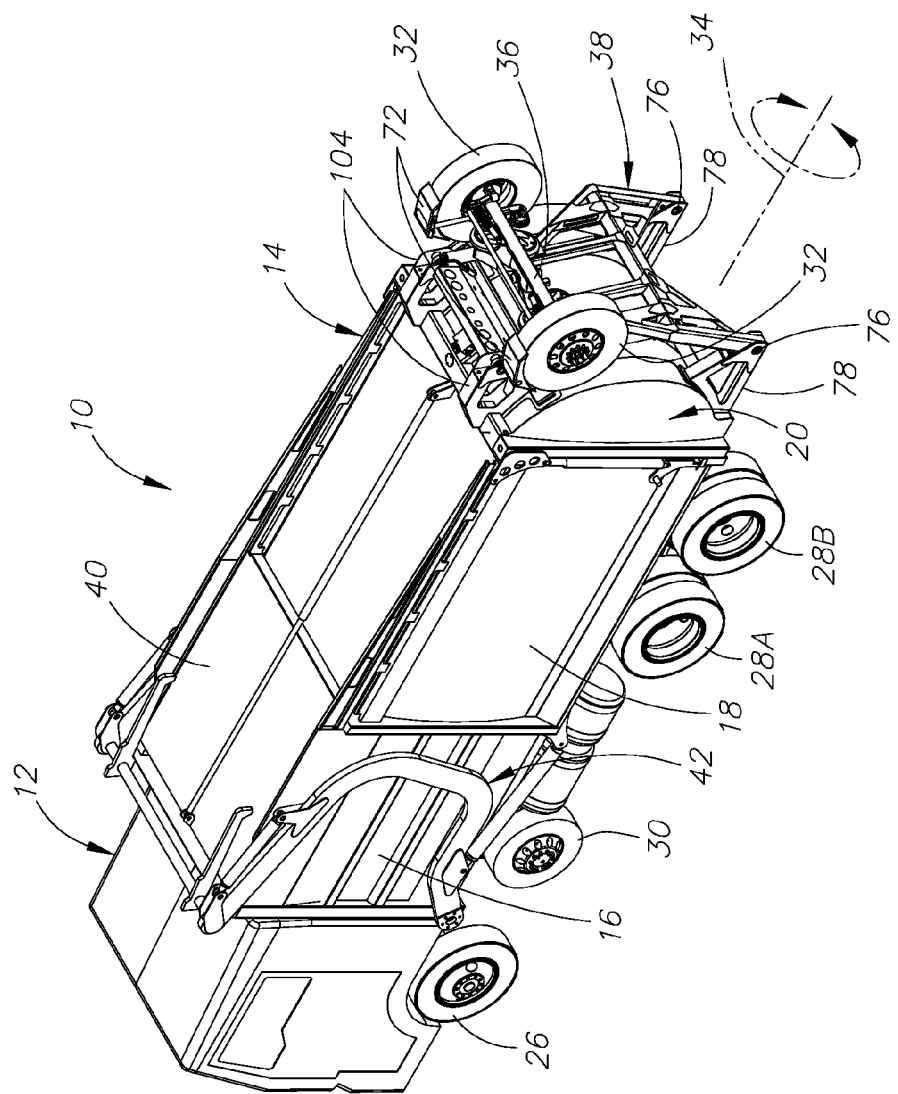
FIG. 3 is an isometric view of the truck depicted in FIG. 1.
Figure 5:
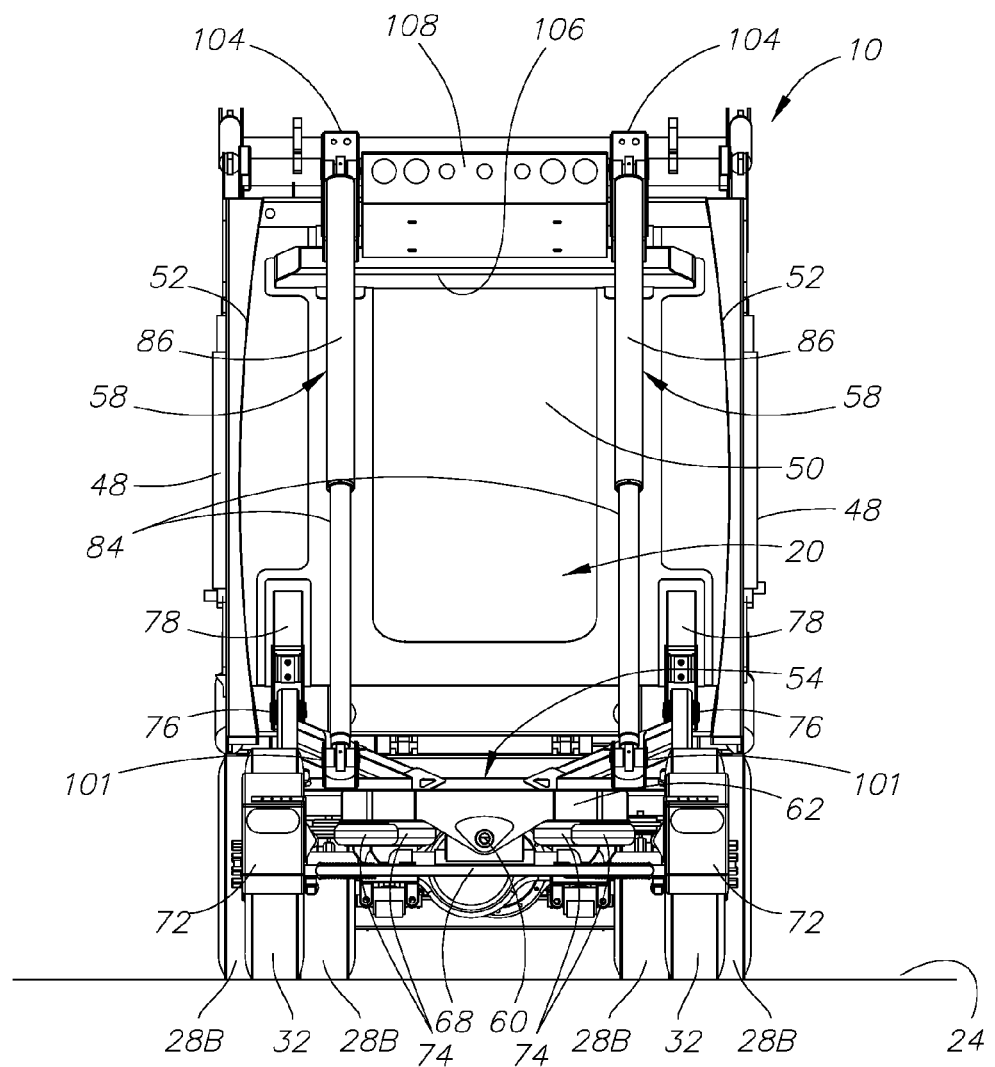
FIG. 5 is an enlarged view taken along the lines 5-5 in FIG. 4 when looking in the direction of the arrows.
Figure 6:
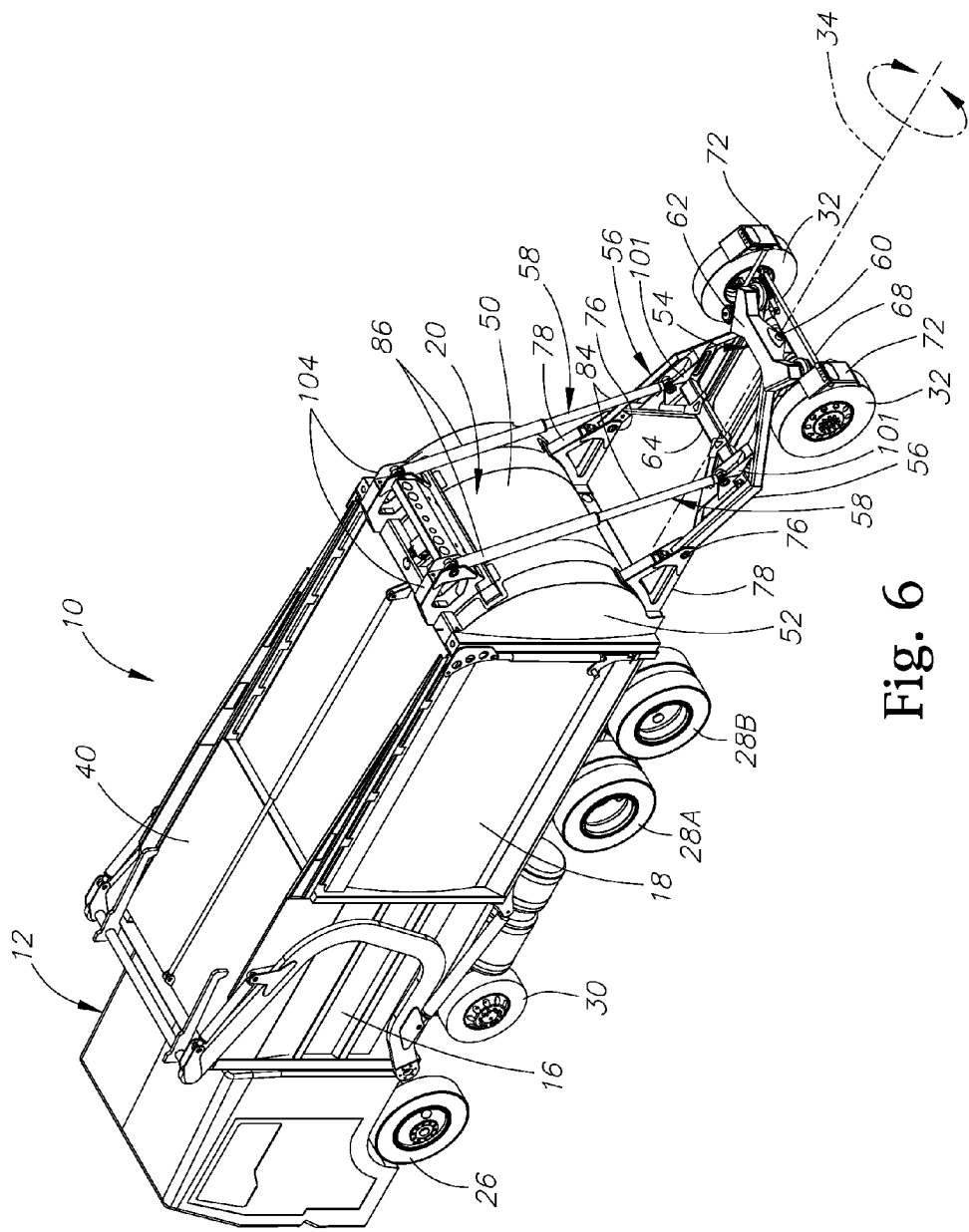
FIG. 6 is an isometric view of the truck as depicted in FIG. 4.
Figure 7:
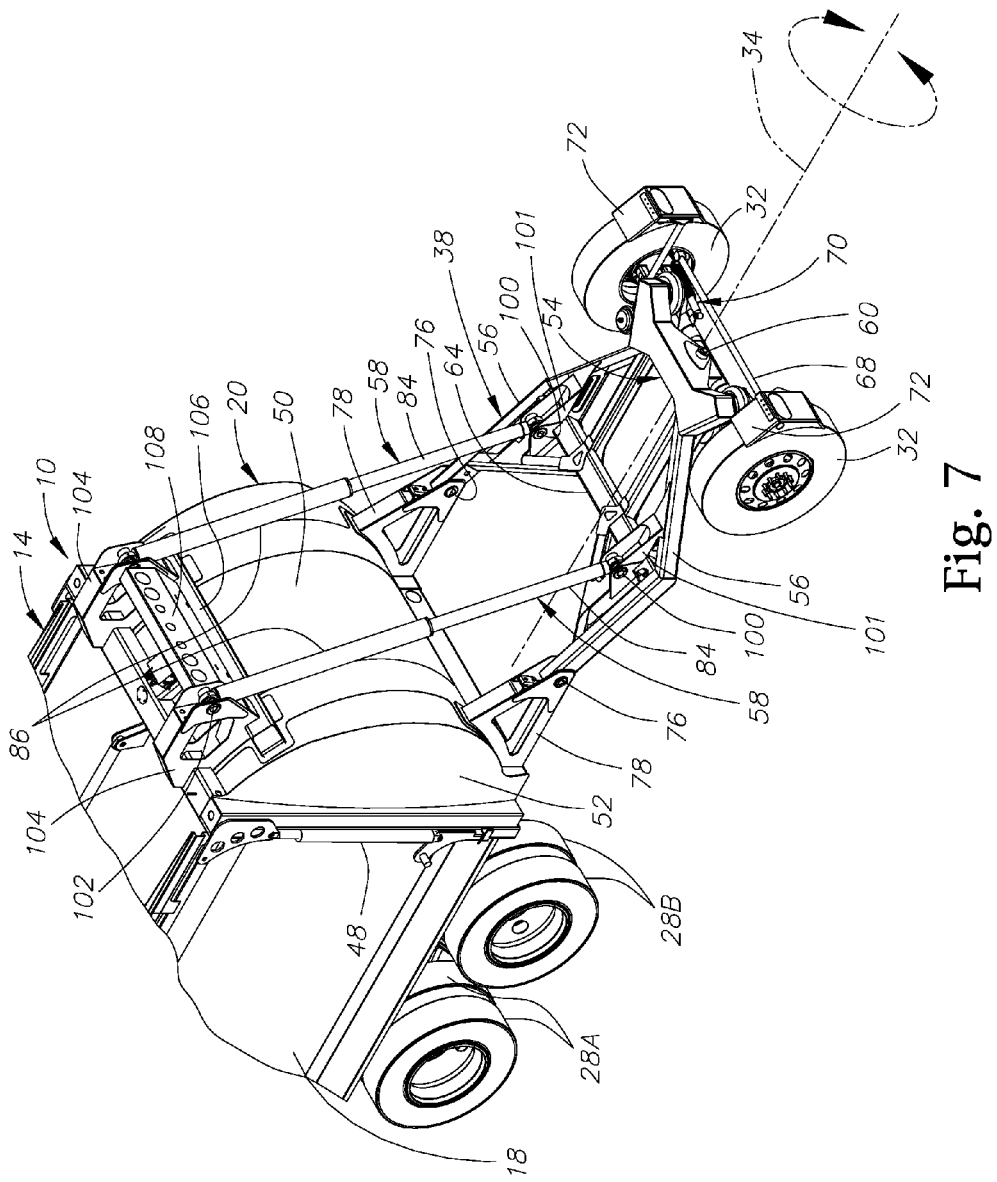
FIG. 7 is an enlarged isometric view of the trailing axle suspension system in its deployed active condition.

Further describing the trailing axle suspension system 38, the suspension arms 56 form rigid integral portions of the carriage 54 and extend parallel to each other between the crossbeam 64 and the tailgate 20 after angling inward to join with the carriage crossmember 62 and are pivotally connected at their distal end to the tailgate 20 with pivot pins 76 and anchoring brackets 78. Wherein the anchoring brackets 78 are of trussed construction, are rigidly joined at their base to bottom corner portions of the tailgate 20 and extend a substantial distance outward thereof and beyond the extent of the convex tailgate side 50 in receiving the pivot pins 76. Whereby the suspension arms 56 with their pivotal connection to the tailgate 20 are firmly pivotally connected with the vehicle frame 22 when the tailgate is closed and latched. And the carriage 54 and thus the trailing axle 36 is thereby adapted to pivot between a stowed condition on the tailgate 52 as shown in FIGS. 1-3 and an active condition as shown in FIGS. 4-6. With the carriage 54 and trailing axle 36 in the stowed condition with the tailgate closed and latched located at their maximum vertical extent and directly above the pivotal connections of the suspension arms when the actuators 58 are fully retracted. And with the fenders 72 then at but not extending above the highest extent allowed of the truck in meeting vehicle height restriction requirements. That for example in many states limit the vehicle height to 13 feet-4 inches and with the fenders 72 in the exemplary embodiment then being just below this maximum height.

On the other hand, the trailing axle 36 when in the active condition with the tailgate closed and latched is located at a substantial distance behind the vehicle with its wheels 32 then contacting with a road surface and the trailing axle being downwardly forced by the actuators 58 as further described later to help support the truck as well as extend its effective wheel base. For example, the trailing axle 36 in the exemplary embodiment is then located at about 13 feet-9 inches behind the center of the rear most driven wheels 28B and thereby significantly adds to the effective wheel base of the truck in meeting bridge restrictions.

Figure 22:
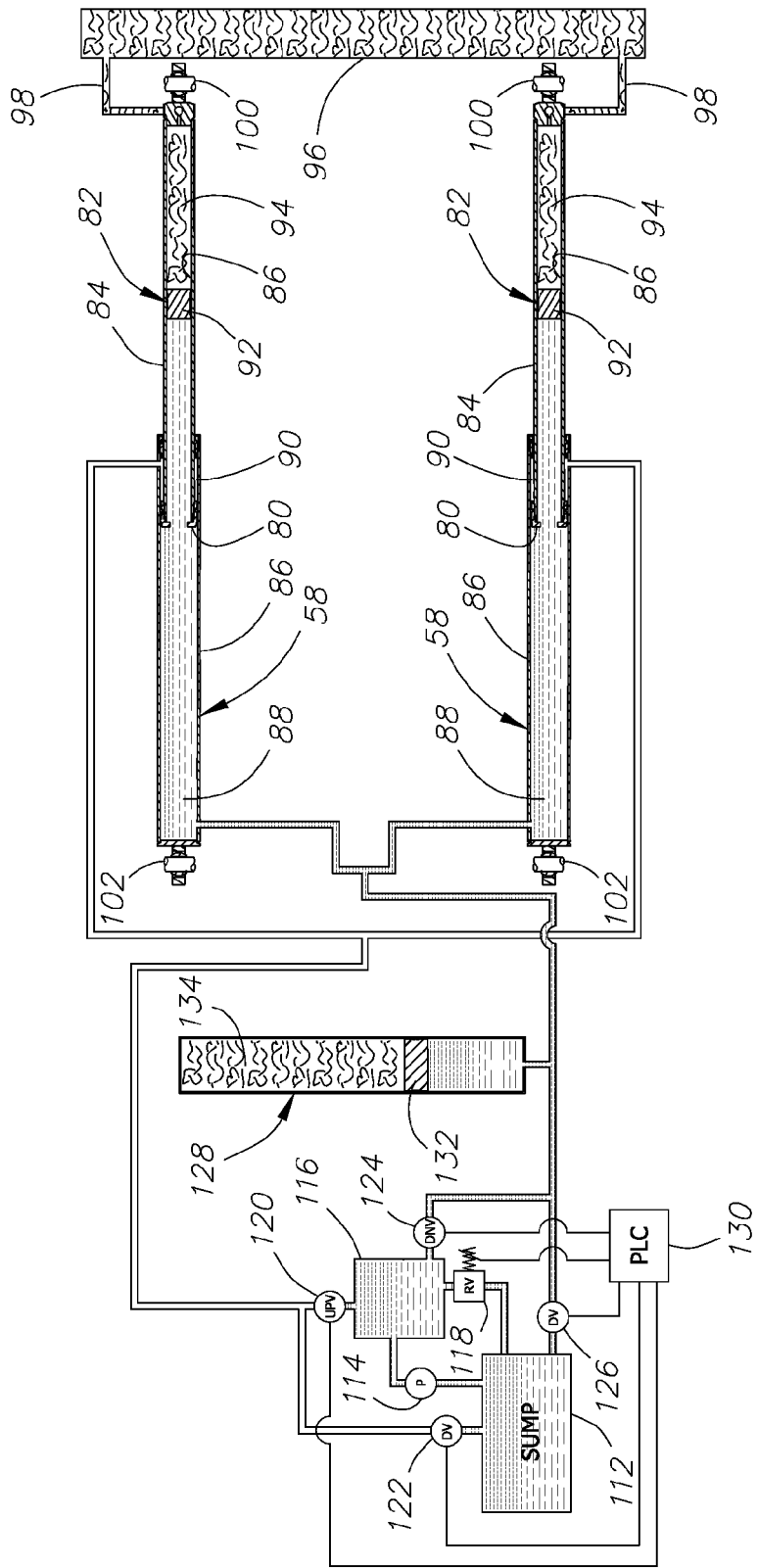
FIG. 22 is a schematic of the components associated with the operation of the actuators in the trailing axle suspension system.

Further describing the actuators 58 and with reference to FIG. 22, they comprise a hydraulically operated piston 80 of cylindrical annular shape and a hydraulically associated gas spring 82. Wherein their piston 80 has an integral piston rod 84, is received in a cylinder 86, and is operated by supplying hydraulic pressure to and exhausting hydraulic fluid from hydraulic chambers 88 and 90 at opposite ends of the piston. And wherein their gas spring comprises a cylindrical piston 92 that is received in a cylinder formed by the piston rod 84, is exposed at one end to hydraulic pressure acting in the chamber 88 through the central opening in the piston 80, and is exposed at the opposite end that is of equal area to a gas chamber 94. To which a suitable gas under pressure is made available by an elongated cylindrical tank 96 that serves as a gas pressure accumulator, is mounted in the crossbeam 64, and is connected at opposite ends by flexible hoses 98 to the gas chamber 94 in the actuators. See FIGS. 12-14 and 25 and 22. And wherein the gas circuit of the actuators comprising their gas chamber 94 and the gas pressure accumulator 96 is charged with a gas such as nitrogen that is free of water vapor and at a suitable pressure to support the actuator gas spring operation later described with the trailing axle 36 in its active load bearing condition.

Describing now the mounting of the actuators 58, they are arranged in parallel laterally-spaced relationship and are pivotally connected at their opposite ends to the suspensions arms 56 and tailgate 20. With the actuators 58 pivotally connected at one end (the projecting end of their piston rod 84) by pivot pins 100 and anchoring brackets 101 to the inwardly-angled portion of the respective suspension arms 56 adjacent the crossbeam 64 and thus at a location intermediate the length of the arms. And with the actuators 58 pivotally connected at their opposite end (the closed end of their cylinder 86) to the tailgate 20 by pivot pins 102 and anchoring brackets 104 of trussed construction. Wherein the brackets 104 are rigidly joined at their base to corner portions of the tailgate 20 adjacent its upper end where it is reinforced by a crossmember 106 to accommodate the resulting forces acting on the tailgate. And wherein the brackets 104 do not extend above the highest extent of the truck body 14 and the refuse pickup system 42 with the tailgate closed but do extend a substantial distance outward of the tailgate and above but not beyond the tailgate's projecting convex side 50 to provide for the outward location of the actuator pivot pins 102 with respect to the tailgate. And wherein there is provided a rectangular box 108 that is mounted on the crossmember 106 between the brackets 104 and houses suitable lights that at this high elevation on the tailgate are readily visible from behind the vehicle when the trailing axle is deployed.

The actuators 58 are thus arranged to extend over the tailgate side 50 with their pivotal connection to the tailgate 20 and are firmly pivotally connected with the vehicle frame 22 when the tailgate is closed and latched and at a location that is (a) forward of the pivotal connection of the carriage 54 with the suspension arms 56 without extending above the highest extent of the truck body 14 and the refuse pickup system 42, and (b) above the highest possible elevation of the center of gravity of a load which is indicated as occurring at approximately the location 110 in the exemplary embodiment where it is situated between the axles of the driven wheels 28A,28B and at a substantial distance above the center height of the truck body 14. And whereby the actuators 58 are thus connected with the tailgate and thereby with the vehicle frame 22 via the truck body 14 to apply optimum resistance by the trailing axle suspension system 38 against forces tending to tilt the vehicle frame about its roll axis 34 that is determined by the setup of the front axle and driven axle suspension systems as earlier mentioned.

Describing now the overall arrangement of the trailing axle suspension system 38, the suspension arm pivot pins 76 are axially aligned as are the actuator pivot pins 100 and 102 with centerlines parallel to the axles of the front wheels 26, driven wheels 28A, 28B and pusher wheels 30 as established by their suspension systems. Whereby the carriage 54 and thereby the trailing axle 36 is supported in parallel relationship with the other axles supporting the truck frame and with the pivot axis/roll axis of the trailing axle provided by its pivot pin 60 in substantial parallel relationship with the truck frame's roll axis 34 and thus for pivotal or tilting movement of the trailing axle in a plane at right angles to the vehicle frame's roll axis when the trailing axle is in its active condition with the truck and trailing axle on a level grade and in planes that remain at right angles to the trailing axle pivot axis that then intersects with the roll axis 34 in a common plane when the trailing axle experiences changes in road grade relative to the truck frame. And the gas springs 74 that operate directly on the centrally pivoted trailing axle 36 with their spring action thus accept and accommodate only the lateral loads or forces acting to tilt the vehicle frame 22 about its roll axis 34 and thus assist the other axle suspension systems in resisting tilting vehicle frame motion in a cushioning manner to a degree that depending on the vehicle loading can be adjusted by the vehicle operator to provide for more tilting resistance by the trailing axle independent of the other axles by simply increasing the air pressure in the gas springs 74.

The direct acting trailing axle gas springs 74 that will also be referred to herein as carriage gas springs have significantly less compliance than that of the pusher axle gas springs and like the latter are arranged at their factory recommended mean road height that is desired for normal spring life. Wherein the carriage gas springs 74 have a compressible volume significantly smaller than that of the pusher axle gas springs and also a static pressure that can be less. And as a result, the carriage gas springs 74 incur a significantly higher pressure increase in compression than that available from the pusher axle gas springs and in their forcibly resisting tilting of the truck frame about its roll axis 34 via the actuators 58. That contributes to a significant degree in comparison with that available from the suspension systems of the primary axles and particularly that of the drive axles when they have been relieved of load to a considerable extent by the trailing axle but with an accompanying decrease in the ability to resist tilting of the frame about its roll axis.

Moreover, the carriage gas springs 74 have the ability because of their close proximity to the trailing axle pivot pin 60 to allow proportionally greater trailing axle wheel amplitudes but not nearly to the extent of that allowed of the pusher axle wheels by their gas springs. And with the pivotal trailing axle 36 and carriage gas springs 74 thus contributing to a significant and vehicle operator adjustable degree in supporting lateral loading on the truck frame while having the cushioning ability to also efficiently accommodate bumps and depressions in a road surface encountered by either or both of the trailing axle wheels 32 to a satisfactory degree while also preventing transmittal of shock forces on the trailing axle wheels to the truck frame from occurrences such as when one of the trailing axle wheels encounters an abrupt bump or dip in the road surface.

Moreover, the actuators 58 in deploying the trailing axle 36 in its active condition and by virtue of their gas spring 82 also allow the trailing axle 36 to extend a significant distance both below road grade relative to the vehicle frame 22 as shown in FIGS. 16 and 17 and above road grade relative to the vehicle frame as shown in FIGS. 19 and 19. For example, the actuators 58 in the exemplary embodiment allow the trailing axle 36 to travel about 20 inches below grade and about 20 inches above. With such trailing axle travel also being allowed in a cushioned manner when the trailing axle wheels 32 encounter bumps and dips in a road surface as shown in FIGS. 20 and 21, respectively.

In considering the enhanced vehicle roll stability provided, it is helpful to understand that the front axle and driven axle suspension systems are adapted in a conventional manner to normally support the vehicle frame 22 at the front wheels 26 and drive wheels 28A, 28B in a ride-height relationship that is substantially parallel to a flat road surface as shown in FIG. 1 with and without a payload. Wherein the roll axis 34 remains generally in the position shown and with respect to which the vehicle frame 22 and thus the cab 12 and truck body 14 as earlier mentioned can pitch and roll under control to a limited degree and can also possibly yaw but to a very limited degree such as when the truck is traveling at a high speed on a curved road. While on the other hand, the trailing axle suspension system 38 is not so limited in ability with regard to resisting tilting of the vehicle frame about its roll axis and its contribution to enhancing vehicle roll stability results from the connection of the actuators 58 with the tailgate at such a high location as compared to the other axle suspension systems that are suspended from the vehicle frame at relatively low locations or if the actuators were connected to the tailgate or the vehicle body at relatively low locations compared with the actuators 58 in the exemplary embodiment. But as a result, the actuators 58 are considerably longer than normal in operating the trailing axle 36 and especially with such a wide range of travel relative to the vehicle frame. And this renders the actuators 58 more prone to gas and hydraulic pressure fluctuation that is prevented by the present invention and could adversely affect their contribution to vehicle roll stability as well as isolating the vehicle from shock forces on the trailing axle's steerable wheels 32.

Describing now the components associated with the operation of the trailing axle suspension system 38 and with reference to FIG. 22, they comprise a vented hydraulic reservoir/sump 112, a hydraulic pump (P) 114, a hydraulic pressure supply manifold 116, a controllable hydraulic pressure regulator valve (RV) 118, an Up Valve (UPV) 120 and associated Dump Valve (DV) 122, a Down Valve (DNV) 124 and associated Dump Valve (DV) 126, a gas spring 128, and a Programmable Logic Controller (PLC) 130. Wherein these components are operatively connected as shown and with the trailing axle suspension system actuators 58. And it will be understood that the PLC 130 is programmed to operate under the command of the vehicle operator in controlling the operation of the trailing axle suspension 38 as will now be described.

The trailing axle suspension actuators 58 as depicted in FIG. 22 have been conditioned to establish the trailing axle 36 in its active condition to assist in supporting the truck. And in accomplishing this, the PLC 130 in response to a command by the vehicle operator has opened the Down Valve 124 and closed the associated Dump Valve 126, closed the Up Valve 120 and opened the associated Dump Valve 122 and while the pump 114 operates continuously in supplying hydraulic fluid under pressure from the sump 112 to the manifold 116 as well as other hydraulically operated components on the truck. At the manifold 116, the pressure of the hydraulic fluid is regulated by the regulator valve 118 that exhausts excess fluid back to the sump beyond that required to maintain the pressure at a desired operating pressure that is determined by the PLC 130 according to the down force prescribed for the trailing axle 36 in assisting to help support the vehicle. And this may for example include an automated process that by controlling the down force on the trailing axle, the trailing axle is utilized to control the loading on all the axles to best advantage in supporting the truck according to the existing weight. And whether this pressure is set for two different operating pressures (a relatively low pressure for little or no added load and a relatively high pressure to accommodate greater loads) or automatically controlled to vary in some manner, the actuators 58 as depicted in FIG. 22 have resultantly extended to deploy and establish the trailing axle 36 in its active condition as shown in FIGS. 4-7 to help support the truck. With this accomplished by the hydraulic pressure then being supplied to the actuator hydraulic chambers 88 while their other hydraulic chambers 90 are exhausted to the sump to thereby deploy and establish the trailing axle in the active condition where it is forced down ward by the hydraulic pressure on the actuator pistons 80 to the desired degree to help support the truck frame as well as extend the effective wheel base of the truck.

The actuator gas springs 82 because of the axial extent of the actuators 58 in being attached at such a high elevation on the tailgate 20 require a spring compliance large enough to satisfy the wide range of trailing axle travel that is allowed while in the active condition as earlier described. While also providing a relatively soft suspension for the trailing axle 36 without significantly detracting from the roll stabilizing effect made available with the pivotal connection of the actuators with the upper end of the tailgate.

And this is accomplished with the gas spring 128 that operates in conjunction with the actuator gas springs 82 and allows the gas pressure accumulator 96 to then be of less volume than if it alone provided sufficient gas pressure reserve to provide for the up and down trailing axle travel in the active condition as previously described and the prevention of gas and hydraulic pressure fluctuations.

Figure 15:
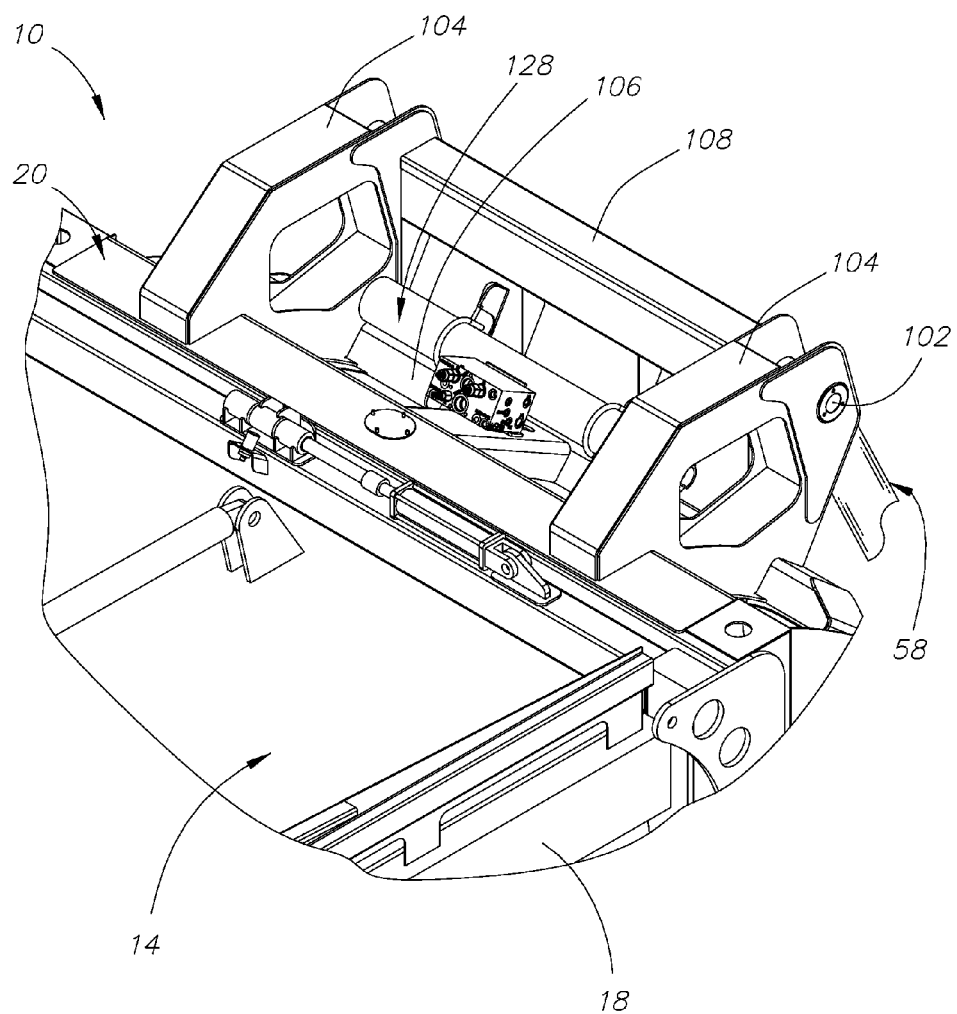
FIG. 15 is an enlarged isometric view of a top portion of the truck body and tailgate from overhead of the vehicle and looking rearward.

The operating mechanism of the gas spring 128 is unlike that of the actuator gas springs 82 in being external of the actuators 58 and is mounted on the outer side of the tailgate 20 at the top end thereof on the tailgate reinforcing crossmember 106 and behind the lights-containing box 108 as shown in FIG. 15 to conveniently connect with the actuators 58 in respect to the hydraulic pressure delivered to position and apply down force on the trailing axle. And again referring to FIG. 22, the gas spring 128 comprises a cylindrical piston 132 having one end acted on by the hydraulic pressure delivered to the actuator hydraulic chambers 88 to deploy and establish the trailing axle 38 in the active condition and an opposite end of equal area acted on by the gas pressure in a chamber 134 that is charged with nitrogen like the gas accumulator 96 but has a significantly smaller gas volume and is charged at a significantly lower pressure.

Whereby the gas chamber 134 serves as a low pressure accumulator and the gas accumulator 96 then serves as a high pressure gas accumulator. With the low pressure gas accumulator 134 thereby providing for the gas spring action provided by the actuators 58 in a first stage with the gas spring 128 in accommodating up and down trailing axle travel with actuator extension and retraction without significant gas and hydraulic pressure fluctuations resulting at relatively low hydraulic operating pressures when the trailing axle is playing a relatively minor role in helping to support the vehicle. And the high pressure gas accumulator 96 at relatively high hydraulic operating pressures beyond the pressure range of the low pressure gas accumulator then providing for the actuator gas spring action on the trailing axle in allowing the actuators to extend and retract to the same extent in a second stage with the gas springs 82 to the same extent provided by the first-stage gas spring 128 without significant gas and hydraulic pressure at the higher hydraulic pressures when the trailing axle is playing a relatively major role in supporting the vehicle. And in view of the operation that the different gas springs 128 and 82 provide, the former will also be referred to herein as the first-stage gas spring and the latter as second-stage gas springs.

For example, the operating range of hydraulic pressure for the actuators 58 may be set at about 300 psi for when the trailing axle is deployed with the truck empty of load or having only a light load added and up to about 1100 psi for when the truck has a full load at and even possibly above the maximum acceptable weight. Given this hydraulic operating pressure range, the gas volume of the first-stage gas spring 128 at maximum displacement is charged with nitrogen at about 190 psi while that of the second-stage gas springs 82 which is considerably larger in volume is charged with nitrogen at about 650 psi. Whereby the hydraulic fluid delivered to the actuator chambers 88 to deploy and apply down force on the trailing axle fills the then acting hydraulic circuit that includes the first-stage gas spring 128 and thus against the gas pressure in the low pressure accumulator 134 acting on the gas spring piston 132. And when the hydraulic pressure reaches 190 psi, the piston starts compressing the nitrogen gas and thereby increasing its pressure. At about 300 psi, only a relatively small portion of the available gas volume in the first-stage gas spring 128 has been reduced and as the trailing axle encounters road grade changes the actuators are allowed to extend and contract because the first-stage gas spring piston 132 travels accordingly against the compressed gas while the second-stage gas spring pistons 92 remain held in position in the actuators by the higher gas pressure acting thereon.

Then if the hydraulic pressure required to maintain a desired down force on the trailing axle exceeds 300 psi, the low pressure accumulator 134 remains in play by virtue of having the ability to further reduce in volume as the hydraulic pressure further increases but the gas in becoming more compressed can reach the point where road grade changes at the trailing axle including bumps and dips could result in significant gas and hydraulic pressure fluctuation if the low pressure accumulator 134 was the only means for preventing such which it is not and as provided by the second-stage gas springs 82. Whose pistons 92 are initially being acted on by the considerably higher gas pressure of 650 psi and have a contractible gas volume extended by the high pressure accumulator 96 that is considerably larger than the low pressure accumulator 134 serving the first-stage gas spring 128. Whereby when the operating hydraulic pressure reaches 650 psi, the second-stage gas spring pistons 92 then begin to compress the gas acting thereon and from 650 psi to 1100 psi, it is the second-stage gas springs 82 that act to allow the actuators 58 to extend and contract in positioning the trailing axle to the same extent allowed by the first-stage gas spring 128 below the 650 psi operating pressure and without incurring significant gas and hydraulic pressure fluctuation. And wherein the transition between the operation of the first-stage gas spring 128 and the second-stage gas springs 82 is gradual and uninterrupted in that the operation of the first-stage gas spring overlaps to a significant degree with the beginning of operation of the second-stage gas springs.

Having described the establishing of the trailing axle 36 in its active condition wherein the contribution to vehicle roll stability by the trailing axle suspension system 38 will be further described later, the trailing axle is established in its stowed condition by the PLC 130 on vehicle operator command by closing the Down Valve 124 and opening the associated Dump Valve 126, and opening the Up Valve 120 and closing the associated Dump Valve 122. Whereby the actuators 58 then retract and lift the trailing axle 36 to its stowed condition with the hydraulic pressure then being supplied from the manifold 116 to the actuator hydraulic chambers 90 with their other hydraulic chambers 88 then exhausted to the sump and the actuators thereby eventually fully retracted in establishing the stowed condition.

Figure 23:
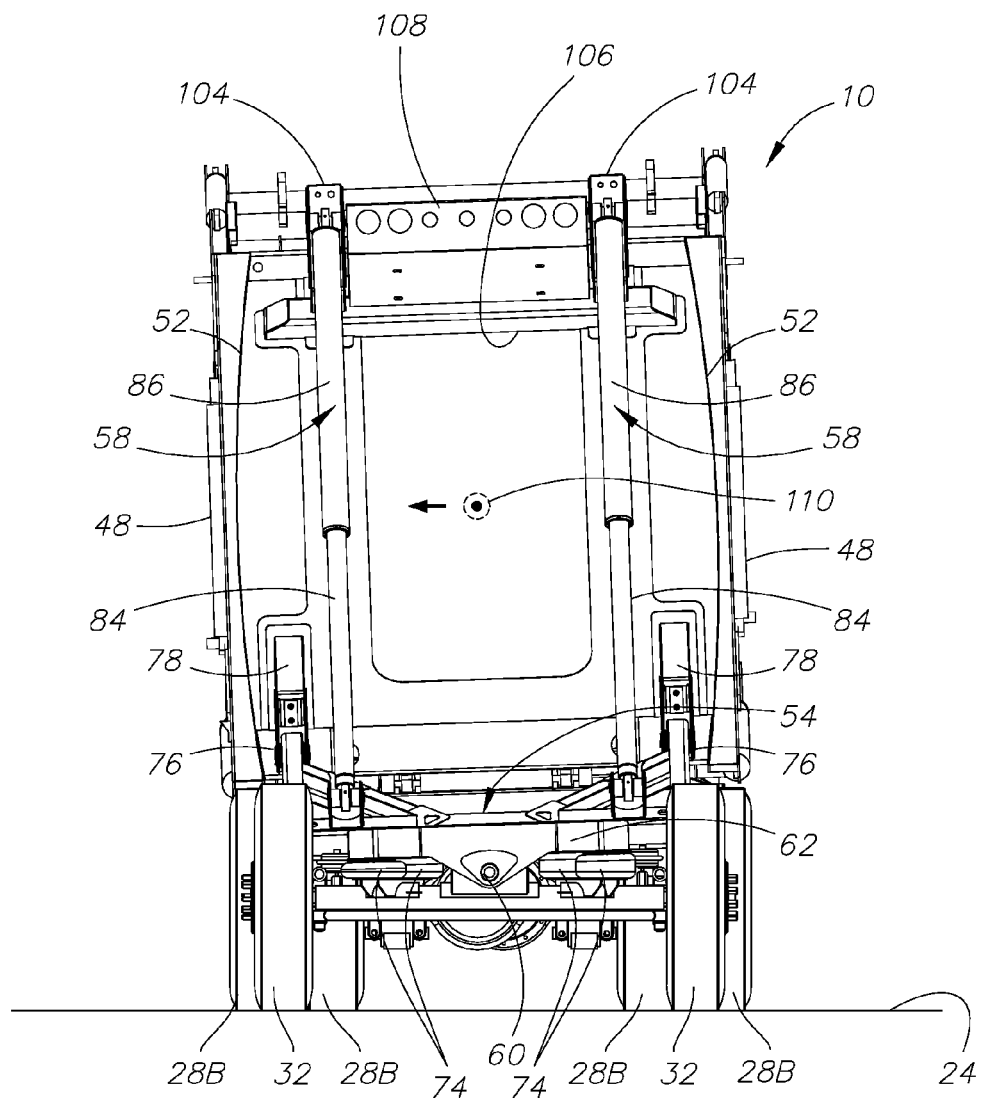
FIG. 23 is a view like FIG. 5 but with the trailing axle wheel fenders omitted and the vehicle frame being forced to tilt about its roll axis in the counter-clockwise direction because of centripetal force acting on the vehicle.

Having described the overall arrangement of the truck's suspension layout and the operation of the trailing axle in helping to support the vehicle, it will thus be appreciated that the actuators 58 are adapted to establish the axle in the stowed condition and active condition with hydraulically forced piston movement and without significant gas and hydraulic pressure fluctuation by splitting the duty between the first-stage gas spring 128 and the second-stage gas springs 82. Wherein in the active condition (a) the trailing axle 36 is forced by the hydraulically operated actuator pistons 80 to assist in supporting the vehicle frame 22 first through the action of the first-stage gas spring 128 up to a predetermined hydraulic pressure set by this gas spring and then overlapping with the beginning of the action of the second-stage gas springs 82 at higher hydraulic pressures as set by these gas springs, (b) the first-stage gas spring 128 and the second-stage gas springs 82 together allow a large prescribed range of movement of the trailing axle relative to the vehicle frame in reaction to road grade changes at the trailing axle wheels 32 and without significantly fluctuating the gas and hydraulic pressure and especially on encountering bumps and dips in a road surface that could affect vehicle roll stability, (c) the first-stage gas spring 128, the second-stage gas springs 82 and the carriage gas springs 74 are available to effectively prevent shock forces on the steerable trailing axle wheels from being transmitted to the tailgate and thus to the vehicle frame, and (d) the spring action available from the actuators 58 and that provided by the carriage gas springs 74 resist movement of the vehicle frame 22 about its roll axis 34 at the pivotal connections of the actuators 58 with the tailgate 20. Wherein the connections of the actuators 58 with the tailgate 20 are at the highest elevation available to counter for example centripetal forces of a magnitude forcing the tilting of the vehicle frame 22 about its roll axis as shown in FIG. 23 and as limited by the contribution of the trailing axle suspension system and especially where the stabilizing affect from the drive axle suspension system is diminished because of the drive axles then supporting less load. And with the present invention serving to provide for such stabilizing action by the trailing axle suspension system without incurring significant gas and hydraulic pressure fluctuations throughout its operating range.

And wherein it will be appreciated that in carrying out this action, the first-stage gas spring 128 is thus operatively associated with the hydraulic pressure applying the down force on the trailing axle and adapted to operate below a predetermined hydraulic operating pressure to allow the actuators to extend and retract and thereby allow the trailing axle to accommodate road grade differences between the trailing axle wheels and the wheels of the primary axles while continuing to help support the vehicle to a certain degree. While the second-stage gas springs 82 are also operatively associated with the operating hydraulic pressure and adapted to allow the actuators to extend and retract to the same extent allowed by the external gas spring when the hydraulic pressure exceeds the predetermined pressure and thereby allow the trailing axle to travel to the same extent in helping to support the vehicle to a greater degree. With the first-stage and second-stage gas springs together effectively preventing significant gas and hydraulic pressure fluctuation throughout the range of actuator operation.

It will also be appreciated that having disclosed an exemplary embodiment of the invention, persons skilled in the art may arrive at various versions or modified forms of the invention constituting other embodiments and as adapted to other types of motor vehicles. And therefore, the scope of the invention is intended to be limited only by the scope of the appended claims.

The invention claimed is:

1. A suspension system for suspending an auxiliary axle from a motor vehicle that is normally supported by other axles, said suspension system comprising a pair of hydraulically operated actuators adapted to position and force the auxiliary axle to help support the vehicle, a first-stage gas spring operatively associated with the hydraulic pressure operating the actuators adapted below a predetermined operating pressure to allow the actuators to extend and retract and thereby allow the auxiliary axle to adjust to road grade differences between the auxiliary axle and the other axles while continuing to help support the vehicle and without the occurrence of significant gas and hydraulic pressure fluctuation, and second-stage gas springs operatively associated with the operating hydraulic pressure adapted to allow the actuators to adjust to the same extent allowed by the first-stage gas spring when the operating pressure exceeds the predetermined pressure and thereby allow the auxiliary axle to adjust to the same extent allowed by the first-mentioned gas spring but at higher operating pressure and while continuing to help support the vehicle and without the occurrence of significant gas and hydraulic pressure fluctuation.

2. A suspension system as set forth in claim 1 wherein the second-stage gas springs are initially charged with a gas at a certain pressure, and the first-stage gas spring is initially charged with a gas at a substantially lower pressure.

3. A suspension system as set forth in claim 1 wherein the second-stage gas springs share a gas pressure accumulator, and the first-stage gas spring has a gas pressure accumulator having a volume that is substantially less than that of the aforementioned gas pressure accumulator.

4. A suspension system as set forth in claim 1 wherein the second-stage gas springs share a gas pressure accumulator, the first-stage gas spring has a gas pressure accumulator having a volume that is substantially less than that of the aforementioned gas pressure accumulator, the first-stage gas spring is initially charged with a gas at a certain pressure, and the second stage gas springs are initially charged with a gas at a substantially higher pressure.

5. A suspension system as set forth in claim 1 wherein the first-stage gas spring has a piston having one end acted on by the operating hydraulic pressure and an opposite end acted on by gas pressure.

6. A suspension system as set forth in claim 1 wherein the second-stage gas springs have a piston having one end acted on by the operating hydraulic pressure and an opposite end acted on by gas pressure.

7. A suspension system as set forth in claim 1 wherein the first-stage gas spring has a piston having one end acted on by the operating hydraulic pressure and an opposite end acted on by gas pressure, and the second-stage gas springs have a piston having one end acted on by the operating hydraulic pressure and an opposite end acted on by gas pressure.

8. A suspension system as set forth in claim 1 wherein the second-stage gas springs share a gas pressure accumulator, the first-stage gas spring has a gas pressure accumulator having a volume that is substantially less than that of the aforementioned gas pressure accumulator, the first-stage gas spring is initially charged with a gas at a certain pressure, the second-stage gas springs are initially charged with a gas at a substantially higher pressure, the first-stage gas spring has a piston having one end acted on by the operating hydraulic pressure and an opposite end acted on by gas pressure in the associated gas pressure accumulator, and the second-stage gas springs have a piston having one end acted on by the operating hydraulic pressure and an opposite end acted on by gas pressure in the associated gas pressure accumulator.

9. A suspension system as set forth in claim 1 wherein the first-stage gas spring is adapted to operate in an overlapping manner with respect to the second-stage gas springs in allowing extension and retraction of the actuators.

10. A suspension system as set forth in claim 1 wherein the motor vehicle has a tailgate, the actuators are pivotally connected to the tailgate, and the first-stage gas spring is mounted on an outer side of the tailgate.

11. A suspension system as set forth in claim 1 wherein the motor vehicle has a tailgate, the actuators are pivotally connected to the tailgate, and the first-stage gas spring is mounted on and outer side of the tailgate and between where the actuators are pivotally connected to the tailgate.

12. A suspension system as set forth in claim 1 wherein the motor vehicle has a tailgate, the actuators are pivotally connected to the tailgate, the first-stage gas spring is mounted on the tailgate, and the second-stage gas springs have a gas pressure accumulator mounted on a carriage from which the auxiliary axle is suspended.

13. A suspension system as set forth in claim 1 wherein the first-stage gas spring is external of the actuators.

14. A suspension system as set forth in claim 1 wherein the first-stage gas spring is external of the actuators, and the second-stage gas springs are internal of the actuators.

* * * * *